(12) United States Patent
Illsley et al.

(10) Patent No.: US 8,268,108 B2
(45) Date of Patent: Sep. 18, 2012

(54) GAS BARRIER COATING HAVING IMPROVED BOND STRENGTH

(75) Inventors: Derek Ronald Illsley, Kent (GB); Asad Aslam Khan, Essex (GB); Michael William Leonard, Kent (GB); Graham Trevor Street, Essex (GB)

(73) Assignee: Sun Chemical Limited, Kent (GB)

( * ) Notice: Subject to any disclaimer, the term of this patent is extended or adjusted under 35 U.S.C. 154(b) by 200 days.

(21) Appl. No.: 12/665,442

(22) PCT Filed: Aug. 22, 2008

(86) PCT No.: PCT/GB2008/002862
§ 371 (c)(1),
(2), (4) Date: Dec. 18, 2009

(87) PCT Pub. No.: WO2009/027648
PCT Pub. Date: Mar. 5, 2009

(65) Prior Publication Data
US 2010/0189944 A1  Jul. 29, 2010

(30) Foreign Application Priority Data
Aug. 24, 2007  (GB) .................................. 0716580.6

(51) Int. Cl.
*B32B 37/14* (2006.01)
*B65D 65/40* (2006.01)

(52) U.S. Cl. ..................................... 156/242; 427/407.1

(58) Field of Classification Search .................. 156/242; 427/407.1, 412.1–412.5
See application file for complete search history.

(56) References Cited

U.S. PATENT DOCUMENTS

| | | | |
|---|---|---|---|
| 4,818,782 A | 4/1989 | Bissot | |
| 5,840,825 A * | 11/1998 | Carlblom et al. | ............. 528/183 |
| 6,599,622 B1 | 7/2003 | Chu et al. | |
| 2005/0037165 A1 | 2/2005 | Ahern et al. | |

FOREIGN PATENT DOCUMENTS

| | | |
|---|---|---|
| CN | 1749117 | 3/2006 |
| EP | 0301878 A1 | 2/1989 |
| EP | 0479031 A1 | 4/1992 |
| EP | 0590263 A2 | 4/1994 |
| JP | 01313536 A | 12/1989 |
| JP | 2003136645 A | 5/2003 |
| JP | 2003136645 A * | 5/2003 |
| JP | 2007-136984 * | 6/2007 |
| JP | 2007136984 A | 6/2007 |
| WO | WO-2007062391 A2 | 5/2007 |

* cited by examiner

*Primary Examiner* — Katarzyna Wyrozebski Lee
*Assistant Examiner* — Scott W Dodds
(74) *Attorney, Agent, or Firm* — McKenna Long & Aldridge LLP

(57) ABSTRACT

In order to maintain adequate bond strength of a composite in which a gas barrier coating comprising a clay dispersion and a polymer solution or dispersion of a PVA and/or EVA is positioned between two flexible plastics films using an adhesive, it is necessary that the clay dispersion and the polymer solution or dispersion should be kept separate until shortly before they are to be applied.

18 Claims, No Drawings

GAS BARRIER COATING HAVING IMPROVED BOND STRENGTH

The present application is a national stage application of PCT/GB2008/002862, filed on Aug. 22, 2008, which claims priority to United Kingdom patent application no. 0716580.6, filed on Aug. 24, 2007, both of which are incorporated by reference for all purposes in their entirety.

The present invention relates to gas barrier coatings, particularly having the ability to block the passage of oxygen, and which may be used to coat and impart gas barrier properties to a variety of materials, notably packaging for foods and pharmaceuticals, where exposure to oxygen needs to be eliminated or restricted.

Synthetic plastics materials have long been used for the packaging of foods and other materials which need protection from handling and from moisture. However, in recent years, it has become appreciated that, in addition, many foods and other sensitive materials benefit from being protected from atmospheric oxygen. A wide variety of multilayer laminate structures has been developed to provide barrier properties and other performance characteristics suited to a pack's purpose. These laminates may be any combination of plastic, metal or cellulosic substrates, and may include one or more coating or adhesive layers. Laminates which include polymeric films having metals or inorganic compounds, such as silicon oxides, deposited thereon have been found to give good general barrier properties and are widely used. However, they may lose their ability to prevent the ingress of oxygen altogether at high temperatures, for example when the packaged material is retorted in order to sterilise and/or cook it. Moreover, the inorganic layer of these types of laminate is rather brittle and may crack or break when the laminate is flexed, resulting in a loss of the gas barrier properties.

More recently, gas barrier coatings comprising dispersed clay, especially nanoparticles, and a hydrophilic polymer, such as polyvinyl alcohol (PVA) or ethylene-vinyl alcohol copolymer (EVOH), have been used, as described, for example, in U.S. Pat. No. 6,599,622, EP 0 590 263, JP01313536A2, JP2007-136984, EPO 479 031 or U.S. Pat. No. 4,818,782. Where these are used as a surface coating, as is described in this prior art, there are no problems. However, we have found that, for many purposes, it is desirable that the coating should have a covering as well as a substrate, and, if the gas barrier coating is to be sandwiched between two films of a laminate in this way, then the bond strength between the films and the coating becomes an issue.

We have surprisingly found that, if a mixture of the clay and the polymer used for the gas barrier coating is prepared and left for a period of time, which can be as low as 24 hours, and if it is then used sandwiched between two or more films forming part of an adhesively formed laminate, the bond strength will have deteriorated alarmingly as compared with the same assembly in which the gas barrier coating mixture has been freshly prepared. There is no obvious explanation for this behaviour and we have no explanation for it, but it is a significant finding with significant commercial consequences.

Coating compositions of this type are commonly prepared by a manufacturer in an appropriate liquid solvent or dispersant and sold as such to the user, who will then coat the appropriate packaging material as required. It is evident that, in the normal course of events, such a pre-prepared coating composition will have been kept for considerably more than 24 hours before it is used. Accordingly, for any applications where any degree of bond strength is important, the resulting coating material will be useless.

Thus, in accordance with the present invention, we have found that, in order to maintain adequate bond strength of a composite in which a gas barrier coating is positioned between two flexible plastics films using an adhesive, it is necessary that the clay dispersion and the polymer solution or dispersion should be kept separate until shortly before they are to be applied.

Thus, in one aspect, the present invention consists in a process for preparing a gas barrier film, comprising mixing a solution or dispersion of a PVA and/or EVOH with an aqueous dispersion of a clay, and then, within 24 hours of completing the mixing, carrying out the steps:
1. coating a first flexible polymer film with the resulting mixture;
2. applying an adhesive coating to either or both of the coated side of the first film or to a second flexible polymer film; and
3. adhering the first and second films together, the bond strength between the two films being at least 1.0N/15 mm, preferably at least 1.5N/15 mm, after full cure of the adhesive has been achieved.

The material is preferably supplied to the customer as a two pack composition, one pack comprising a solution or dispersion of a PVA and/or EVOH, and the other comprising an aqueous dispersion of a clay.

The time taken for the adhesive to cure fully will vary depending on the nature of the adhesive and will be well known to those skilled in the field. For example, it can take up to 10 days at room temperature with conventional isocyanate-based adhesives, and up to 10 days at 50° C. with aliphatic isocyanate 2-pack types.

Where the adhesive is applied to the second film only, steps 1 and 2 may be carried out in any order. Step 3, in any event, is carried out after steps 1 and 2.

There is no particular restriction on the nature of the PVA or EVOH used in the present invention, provided that it can form a solution or dispersion in an aqueous medium. Such polymers have a high proportion of free hydroxy groups which can form hydrogen bonds with salt groups in the metal silicate and thus serve as a dispersing agent for the silicate. Examples of such polymers are described in, for example, U.S. Pat. No. 6,599,622 or EP00590263B1, the disclosure of which is incorporated herein by reference.

The clay used is preferably nanoparticulate. Also preferably a portion of the clay mineral has been intercalated or exfoliated during the dispersion process. There is no restriction on the type of clay used in this invention provided it is sufficiently dispersible in an aqueous medium and that it is capable of being intercalated or exfoliated during dispersion. In an exfoliated form the aspect ratio of the clay (i.e. the ratio between the length and thickness of a single clay 'sheet') will have an impact on the level of oxygen barrier achieved. The greater the aspect ratio, the more the rate of oxygen diffusion through the dry coating and laminate will be reduced. Clay minerals with aspect ratios between 20 and 10,000 are preferably used. Particularly preferred are those minerals having an aspect ratio greater than 100. Examples of suitable clays include kaolinite, montmorillonite, atapulgite, illite, bentonite, halloysite, kaolin, mica, diatomaceous earth and fuller's earth, calcined aluminium silicate, hydrated aluminium silicate, magnesium aluminium silicate, sodium silicate and magnesium silicate. Commercial examples of suitable materials are Cloisite Na+ (available from Southern Clay), Bentone ND (available from Elementis), Of these, the clays, especially the montmorillonite clays, are preferred, nanoparticulate clays being most preferred.

The coating composition is applied in the form of a solution or dispersion of the clay and the polymer in a suitable solvent. The solvent is preferably aqueous, and is more preferably water, optionally containing a small quantity of a miscible co-solvent, such as an alcohol (for example ethanol, n-propanol or isopropanol) or a ketone (such as acetone). Where a co-solvent is present, this can be up to 75% (w/w) of the total composition. However, it is preferred that the content of the co-solvent is less than 50%, more preferably less than 50% of the entire composition. The preferred co-solvent is an alcohol, preferably n-propanol, ethanol or isopropanol.

If desired, in addition to the PVA and/or EVOH, other polymers or resins may be included in the coating composition, provided these co-resins are themselves compatible in the final composition. Examples of such polymers and resins include solution acrylics, acrylic emulsions, polyesters, alkyds, sulphopolyesters, polyurethanes, vinyl acetate emulsions, poly(vinyl butyral), poly(vinyl pyrrolidone), poly(ethylene imine), polyamides, polysaccharides, proteins, epoxies, etc. It is also possible to include sol-gel precursors in these compositions, e.g. a hydrolysate of tetraethyl orthosilicate.

The overall solids content of the coating composition is preferably from 0.5 to 15%; more preferably from 2 to 8% (w/w), which is relatively low, in order to delay or prevent the premature onset of gelation of the coating, which results from the build up of structure held in place by weak electrostatic charges.

The coating should be supplied to the customer as a two pack, the first part containing the dispersed clay, the second an aqueous solution of the PVA and/or EVOH and optionally other soluble and dispersed resins.

The amount of polymer (total of PVA, EVOH and optional polymers and resins) in the coating composition is preferably from 40 to 95% of the total solids comprising polymer and clay, and more preferably from 50 to 90%. In other words, the ratio of clay to polymer is preferably from 1.5:1 to 1:19, more preferably from 1:1 to 1:9. The concentration of clay and polymer in the solution will depend on their solubility/dispersability and the way in which the coating will be applied (gravure, flexo, curtain coating, roll coating, dip coating, spray, etc.), the amount of solvent employed preferably being the minimum needed to achieve sufficient flowability to coat the substrate adequately. In general, the clay will be employed in the form of a 1.0-15% by weight solution/dispersion in water or water+co-solvent (prior to its addition to the PVOH/EVOH containing component), and this will dictate the contents of the remaining components.

The coating composition of the present invention comprising the clay, the polymer solution or dispersion and a solvent therefor may be applied to a substrate by any conventional means. The solvent may then be removed, e.g. by heating, leaving a film comprising the clay dispersed through the polymer on the substrate. The resulting gas barrier film is then adhered to a further flexible plastics sheet.

The thickness of the coating of the present invention will depend in part on the ability of the clay to form a continuous, coherent coating layer. However, in general, we prefer that the coating should be from 50 nm to 3000 nm thick, more preferably from 200 to 2000 nm thick.

The coatings can be applied at any wet film weight; but ultimately the maximum wet film weight will be determined by the need to apply these coatings at realistic press speeds on conventional presses. Therefore, a likely practical upper limit of around 15 gsm (wet) applied film weight is likely. Given that the solid content of these coatings will be in the range 4-9%, then the likely maximum dry film weight applied would be around 1.5 gsm (dry). Film weight may be a more useful measure than film thickness due to the differing densities of PVOH (ca. 1.3) and the clay (for montmorillonite about 2.5).

There is no particular restriction on the nature of the flexible substrate, although it is preferably a plastics film, and any material suitable for the intended use may be employed. However, where the matter being packaged with the coating film of the present invention is a foodstuff or pharmaceutical, it will normally be preferred that the plastics film or other substrate should be food grade. Examples of suitable materials include: polyolefins, such as polyethylene or polypropylene; polyesters, such as polyethylene terephthalate, polybutylene terephthalate or polyethylene naphthenate; polyamides, such as nylon-6 or nylon-66; and other polymers, such as polyvinyl chloride, polyimides, acrylic polymers, polystyrenes, celluloses, or polyvinylidene chloride. It is also possible to use copolymers of any compatible two or more of the monomers used to produce these polymers. Furthermore, compositions of the present invention may be included in adhesively formed laminates comprising paper substrates (such as polyester and polyolefin coated paperboards commonly encountered in food packaging). We especially prefer the polyesters.

The substrate is preferably treated by corona discharge immediately prior to its being coated with the composition of the present invention. This process is well known in the art and is described, for example, in "Plastics Finishing and Decoration", edited by Donatas Satas, published by Van Nostrand Reinhold Company in 1986, at pages 80-86. In the Examples hereafter, for the corona discharge treatment we achieved a surface energy greater than 50 Dynes/cm.

The two flexible polymer films may be the same as each other or they may be different from each other.

There is no particular restriction on the nature of the adhesive used, and any adhesive commonly used for the adhesion of two or more plastics films may be employed in the present invention. Examples of suitable adhesives include solvent-based (polyurethane) types such as those from Henkel (Liofol UR3969/UR 6055, Liofol UR3640/UR6800, Liofol UR3894/UR6055), Rohm & Haas (Adcote 811/9L10) and Coim (CA2525/2526), Solvent-free polyurethane adhesives such as Liofol 7780/UR6082, UR7750/UR6071 from Henkel, and Mor-Free ELM-415A/Mor-Free CR140 from Rohm & Haas, can also be used. As well as polyurethane adhesives, epoxy-based types such as Lamal 408-40A/C5083 may be used. Waterborne adhesives, such as Aqualam 300A/300D, an epoxy type from Rohm & Haas may also be used.

The adhesive may be applied directly to one of the films and then adhered to the gas barrier coating on the other film, or it may be applied to the gas barrier coating on one film and then adhered to the other film. In any case, the order of layers will be: a plastics film; the gas barrier coating; an adhesive; and another plastics film. If desired, layers of other materials may be interposed between any two of these layers, or on either side of the 2 flexible plastic substrates having the barrier coating between them.

In accordance with the present invention, it is critical that the various operations described above should be carried out as soon as possible after mixing the PVA and/or EVOH with the clay dispersion. Ideally, these steps are carried out immediately after the gas barrier components are mixed. However, at worst, they should be carried out within 24 hours, preferably within 12 hours, more preferably within 6 hours and most preferably within 2 hours.

The invention still further provides a packaged foodstuff, pharmaceutical or other material sensitive to oxygen, wherein the packaging comprises a gas barrier material of the present invention.

The invention is further illustrated by the following non-limiting Examples.

EXAMPLES 1-23

The oxygen transmission rates of the coated samples were determined on a Mocon Oxtran 2/21 gas permeability tester at 23° C. and 50% relative humidity. The substrate used in all cases was a 12 μm gauge polyethylene terephthalate film having a vacuum deposited aluminium coating hereinafter referred to as 'Al-PET'. The coatings were applied with a No. 2 K-bar and were dried in a warm flow of air (lab prints were dried with a hair dryer).

The laminates were prepared by applying the coating to the metallised side of the 'Al-PET', an adhesive was applied over the top of the dried coating then laminated to the treated side of a 30 μm gauge poly(ethene). The reverse side of the metallised polyester substrate was then coated with adhesive and laminated to the treated side of a 38 μm gauge poly(ethane) to provide the final three ply laminate structure. The adhesive used was supplied by Coim, CA 2525-3 along with Catalyst CA 2526-3, and was prepared according to the manufacturer's instructions and applied so as to achieve a final dry film weight of 2.5 gsm. The laminates were then stored for 10 days at 50° C. to ensure full cure of the isocyanate-based adhesive.

The laminates were then tested for bond strength (N/15 mm) and oxygen transmission rates. Where the film tears during the bond strength test, this shows that the adhesive bond is stronger than the plastics film and so the bond strength is necessarily greater than 1.5N/15 mm, and probably in excess of 3.0N/15 mm.

Example 1 (Comparative)

'Al-PET' alone. This was laminated into the three ply structure as described above. After curing, the oxygen transmission rate was 1.00 cm$^3$/m$^2$/24 h and the polyester tore during the bond strength testing.

Example 2 (Comparative)

'Al-PET' coated with a simple PVA solution to act as a comparison.

Thus, 2.6 parts of PVA 3-96 in 21.4 parts of water were heated to 90° C. and stirred for 30 minutes. The solution was allowed to cool, and then a mixture of 8 parts of water and 8 parts of isopropyl alcohol was added. The final solution was applied to 'Al-PET' at an approximate wet film thickness of 12 μm. The coating was then dried before preparing the laminate.

The oxygen transmission rate of the laminate was 0.50 cm$^3$/m$^2$/24 h and the polyester film tore during the bond strength test.

Example 3

A coating was prepared by blending 8 parts of isopropyl alcohol with 17.7 parts of water, 10.3 parts of a 19% (w/w) solution of PVA 3-96 and 14 parts of a pre made 6% (w/w) dispersion of Cloisite Na+. The composition was then applied directly after blending to the metallised side of Al-PET and made into a laminate as described above. The oxygen transmission rate was less than 0.1 cm$^3$/m$^2$/24 h and the polyester film tore during the bond strength test.

Example 4

A coating was prepared by blending 8 parts of isopropyl alcohol with 17.7 parts of water, 10.3 parts of a 19% (w/w) solution of PVA 3-96 and 14 parts of a pre made 6% (w/w) dispersion of Cloisite Na+. The composition was then left standing for eight hours before being applied to the metallised side of Al-PET and made into a laminate as described above. The oxygen transmission rate was less than 0.1 cm$^3$/m$^2$/24 h and the polyester film tore during the bond strength test.

Example 5 (Comparative)

A coating was prepared by blending 8 parts of isopropyl alcohol with 17.7 parts of water, 10.3 parts of a 19% (w/w) solution of PVA 3-96 and 14 parts of a pre made 6% (w/w) dispersion of Cloisite Na+. The composition was then left standing for twenty four hours before being applied to the metallised side of Al-PET and made into a laminate as described above. The oxygen transmission rate was less than 0.1 cm$^3$/m$^2$/24 h and the bond strength test gave a result of 1.2 N across 15 mm.

Example 6 (Comparative)

A coating was prepared by blending 8 parts of isopropyl alcohol with 17.7 parts of water, 10.3 parts of a 19% (w/w) solution of PVA 3-96 and 14 parts of a pre made 6% (w/w) dispersion of Cloisite Na+. The composition was then left standing for 3 weeks before being applied to the metallised side of Al-PET and made into a laminate as described above. The oxygen transmission rate was less than 0.1 cm$^3$/m$^2$/24 h and the bond strength test gave a result of 0.4 N across 15 mm.

Example 7

A two pack coating was prepared, where part one was made by blending 8 parts of isopropyl alcohol with 17.7 parts of water and 10.3 parts of a 19% (w/w) solution of PVA 3-96. Part two consisted of 14 parts of a pre made 6% (w/w) dispersion of Cloisite Na+. The two parts were left to stand for twenty four hours before being blended together, and the blend was applied immediately to the Al-PET and laminated as described above. The oxygen transmission rate was below 0.1 cm$^3$/m$^2$/24 h and the polyester film tore during the bond strength test.

Example 8

A two pack coating was prepared, where part one was made by blending 7.6 g of Cloisite Na+ with 147 g of water and 72 g of isopropyl alcohol. Part two consisted of 102 g of a 17.2% (w/w) solution of PVA 3-96. The two parts were left to stand for twenty four hours before being blended together, and the blend was applied immediately to the Al-PET and laminated as described above. The oxygen transmission rate was below 0.1 cm$^3$/m$^2$/24 h and the polyester film tore during the bond strength test.

Example 9

A two pack coating was prepared, where part one was made by blending 7.6 g of Cloisite Na+ with 147 g of water and 72 g of isopropyl alcohol. Part two consisted of 102 g of a 17.2%

(w/w) solution of PVA 3-96. The two parts were left to stand for four weeks before being blended together, and the blend was applied immediately to the and Al-PET laminated as described above. The oxygen transmission rate was below 0.1 cm$^3$/m$^2$/24 h and the polyester film tore during the bond strength test.

Example 10

A coating was prepared by blending 8 parts of isopropyl alcohol with 13.9 parts of water, 8.8 parts of a 19% (w/w) solution of PVA 3-96 and 9.3 parts of a pre made 12% (w/w) dispersion of Bentone ND. The composition was then left standing for eight hours before being applied to the metallised side of Al-PET and made into a laminate as described above. The oxygen transmission rate was less than 0.1 cm$^3$/m$^2$/24 h and the polyester film tore during the bond strength test.

Example 11 (Comparative)

A coating was prepared by blending 8 parts of isopropyl alcohol with 13.9 parts of water, 8.8 parts of a 19% (w/w) solution of PVA 3-96 and 9.3 parts of a pre made 12% (w/w) dispersion of Bentone ND. The composition was then left standing for twenty four hours before being applied to the metallised side of Al-PET and made into a laminate as described above. The oxygen transmission rate was less than 0.1 cm$^3$/m$^2$/24 h and the bond strength test gave a result of 1.0 N across 15 mm.

Example 12 (Comparative)

A coating was prepared by blending 8 parts of isopropyl alcohol with 13.9 parts of water, 8.8 parts of a 19% (w/w) solution of PVA 3-96 and 9.3 parts of a pre made 12% (w/w) dispersion of Bentone ND. The composition was then left standing for one hundred and sixty eight hours before being applied to the metallised side of Al-PET and made into a laminate as described above. The oxygen transmission rate was less than 0.1 cm$^3$/m$^2$/24 h and the bond strength test gave a result of 0.6 N across 15 mm.

Example 13

A coating was prepared by blending 8 parts of isopropyl alcohol with 13.9 parts of water, 8.9 parts of a 18.8% (w/w) solution of PVA 4-88 and 9.3 parts of a pre made 12% (w/w) dispersion of Bentone ND. The composition was then left standing for eight hours before being applied to the metallised side of Al-PET and made into a laminate as described above. The oxygen transmission rate was less than 0.1 cm$^3$/m$^2$/24 h and the polyester film tore during the bond strength test.

Example 14 (Comparative)

A coating was prepared by blending 8 parts of isopropyl alcohol with 13.9 parts of water, 8.9 parts of a 18.8% (w/w) solution of PVA 4-88 and 9.3 parts of a pre made 12% (w/w) dispersion of Bentone ND. The composition was then left standing for twenty four hours before being applied to the metallised side of Al-PET and made into a laminate as described above. The oxygen transmission rate was less than 0.1 cm$^3$/m$^2$/24 h and the bond strength test gave a result of 0.9 N across 15 mm.

Example 15 (Comparative)

A coating was prepared by blending 8 parts of isopropyl alcohol with 13.9 parts of water, 8.9 parts of a 18.8% (w/w) solution of PVA 4-88 and 9.3 parts of a pre made 12% (w/w) dispersion of Bentone ND. The composition was then left standing for one hundred and sixty eight hours before being applied to the metallised side of Al-PET and made into a laminate as described above. The oxygen transmission rate was less than 0.1 cm$^3$/m$^2$/24 h and the bond strength test gave a result of 0.4 N across 15 mm.

Example 16 (Comparative)

'Nuroll PX' coated with a simple PVA solution to act as a comparison.
Thus, 3 parts of PVA 3-96 in 36 parts of water were heated to 90° C. and stirred for 30 minutes. The solution was allowed to cool, and then mixed with 8 parts of isopropyl alcohol. The final solution was applied to 'Nuroll PX' at an approximate wet film thickness of 12 µm. The coating was then dried before preparing the laminate.
The oxygen transmission rate of the laminate was 1.1 cm$^3$/m$^2$/24 h and the bond strength test gave a result of 1.5 N across 15 mm.

Example 17 (Comparative)

'Melinex 800' coated with a simple PVA solution to act as a comparison.
Thus, 3 parts of PVA HR 3010 in 36 parts of water were heated to 90° C. and stirred for 30 minutes. The solution was allowed to cool, and then mixed with 8 parts of isopropyl alcohol. The final solution was applied to 'Melinex 800' at an approximate wet film thickness of 12 µm. The coating was then dried before preparing the laminate.
The oxygen transmission rate of the laminate was 1.1 cm$^3$/m$^2$/24 h and the bond strength test gave a result of 1.5 N across 15 mm.

Example 18 (Comparative)

'Mylar 813' coated with a simple PVA solution to act as a comparison.
Thus, 3 parts of PVA AQ 4104 in 36 parts of water were heated to 90° C. and stirred for 30 minutes. The solution was allowed to cool, and then mixed with 8 parts of isopropyl alcohol. The final solution was applied to the treated side of 'Mylar 813' at an approximate wet film thickness of 12 µm. The coating was then dried before preparing the laminate.
The oxygen transmission rate of the laminate was 1.2 cm$^3$/m$^2$/24 h and the bond strength test gave a result of 1.6 N across 15 mm.

Example 19

A coating was prepared by blending 8 parts of isopropyl alcohol with 17.7 parts of water, 10.3 parts of a 19% (w/w) solution of PVA 3-96 and 14 parts of a pre made 6% (w/w) dispersion of Cloisite Na+. The composition was then applied directly after blending to the treated side of 'Nuroll PX' and made into a laminate as described above. The oxygen transmission rate was 0.2 cm$^3$/m$^2$/24 h and the bond strength test gave a result of 1.6 N across 15 mm.

Example 20

A coating was prepared by blending 8 parts of isopropyl alcohol with 8 parts of water, 21.7 parts of a 9% (w/w) solution of PVA HR 3010 and 14 parts of a pre made 6% (w/w) dispersion of Cloisite Na+. The composition was then applied directly after blending to the treated side of 'Melinex 800' and made into a laminate as described above. The oxygen transmission rate was 0.2 cm$^3$/m$^2$/24 h and the bond strength test gave a result of 1.5 N across 15 mm.

Example 21

A coating was prepared by blending 8 parts of isopropyl alcohol with 8 parts of water, 21.7 parts of a 9% (w/w) solution of PVA HR 3010 and 14 parts of a pre made 6% (w/w) dispersion of Cloisite Na+. The composition was then left standing for twenty four hours before being applied to the treated side of 'Melinex 800' and made into a laminate as described above. The oxygen transmission rate was 0.2 cm$^3$/m$^2$/24 h and the bond strength test gave a result of 0.4 N across 15 mm.

Example 22

A two pack coating was prepared, where part one was made by blending 8 parts of isopropyl alcohol with 8 parts of water and 21.7 parts of a 9% (w/w) solution of PVA HR 3010. Part two consisted of 14 parts of a pre made 6% (w/w) dispersion of Cloisite Na+. The two parts were left to stand for twenty four hours before being blended together, and the blend was applied immediately to the 'Melinex 800' and laminated as described above. The oxygen transmission rate was 0.2 cm$^3$/m$^2$/24 h and the bond strength test gave a result of 1.7 N across 15 mm.

Example 23

A coating was prepared by blending 5.25 parts of isopropyl alcohol with 19.3 parts of water, 19.75 parts of a 10.5% (w/w) solution of PVA AQ4104 and 14 parts of a pre made 6% (w/w) dispersion of Cloisite Na+. The composition was then applied directly after blending to the treated side of 'Mylar 813' and made into a laminate as described above. The oxygen transmission rate was 0.2 cm$^3$/m$^2$/24 h and the bond strength test gave a result of 1.7 N across 15 mm.

The invention claimed is:

1. A process for preparing a gas barrier material, comprising mixing a solution or dispersion of a polyvinyl alcohol (PVA) and/or ethylene-vinyl alcohol compolymer (EVOH) with an aqueous dispersion of a clay, and then, within 24 hours of completing the mixing, carrying out the steps:
   a. coating a first flexible polymer film with the resulting mixture;
   b. applying an adhesive coating to either or both of the coated side of the first film or to a second flexible polymer film; and
   c. adhering the first and second films together such that the coated side of the first film is joined to the second film via the adhesive, and maintaining the adherence until the bond strength between the two films is at least 1.0 N/15 mm after the adhesive has fully cured.

2. A process according to claim 1, in which some or all of the clay has been intercalated or exfoliated during dispersion.

3. A process according to claim 1, in which the clay has an aspect ratio from 20 to 10,000.

4. A process according to claim 1, in which the amount of PVA and/or EVOH polymer is from 40 to 95% of the total solids comprising polymer and clay.

5. A process according to claim 1, in which the amount of PVA and/or EVOH polymer is from 50 to 90% of the total solids comprising polymer and clay.

6. A process according to claim 1, in which the thickness of the coating is from 50 nm to 3000 nm.

7. A process according to claim 6, in which the thickness of the coating is from 200 to 2000 nm.

8. A process according to claim 1, in which steps a, b and c are carried out within 12 hours of completing the mixing.

9. A process according to claim 8, in which steps a, b and c are carried out within 6 hours of completing the mixing.

10. A process according to claim 9, in which steps a, b and c are carried out within 2 hours of completing the mixing.

11. A process according to claim 1, in which the adherence is maintained until the bond strength between the two films is at least 1.5 N/15 mm after the adhesive has fully cured.

12. A process according to claim 11, in which some or all of the clay has been intercalated or exfoliated during dispersion, the clay has an aspect ratio from 20 to 10,000, the amount of PVA and/or EVOH polymer is from 40 to 95% of the total solids comprising polymer and clay.

13. A process according to claim 12, in which the thickness of the coating is from 50 nm to 3000 nm.

14. A process according to claim 13, in which the thickness of the coating is from 200 to 2000 nm, and in which steps a, b and c are carried out within 12 hours of completing the mixing.

15. A process according to claim 14, in which steps a, b and c are carried out within 6 hours of completing the mixing.

16. A process according to claim 15, in which steps a, b and c are carried out within 2 hours of completing the mixing.

17. A process according to claim 11, in which steps a, b and c are carried out within 12 hours of completing the mixing.

18. A process according to claim 11, in which steps a, b and c are carried out within 6 hours of completing the mixing.

* * * * *